May 27, 1924.
A. A. GROSSARTH
GEAR CUTTER
Filed June 15, 1922
1,495,388
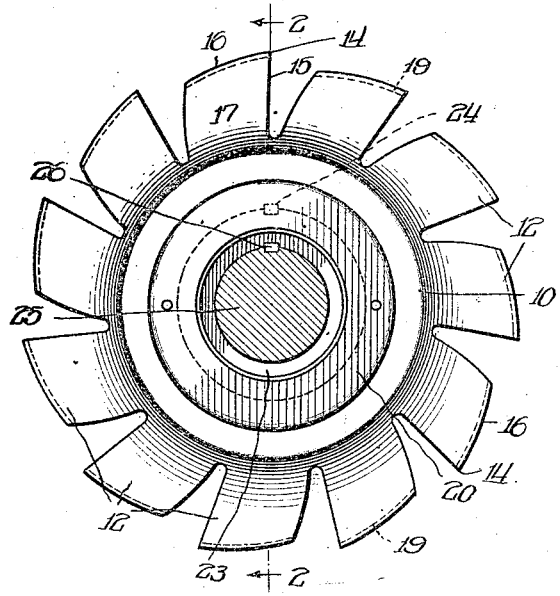
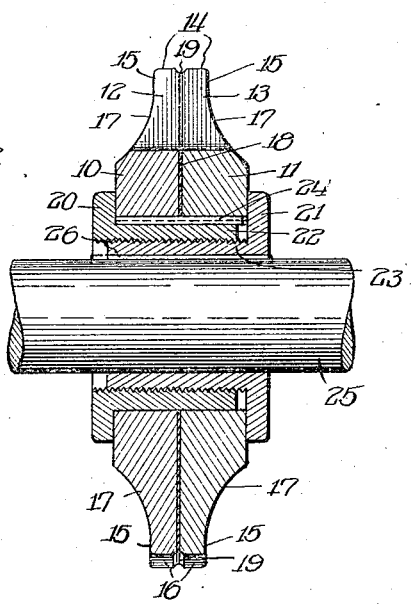
Witness:
R. Burkhardt.
Inventor:
Albert A. Grossarth,
By Wilkinson, Huxley, Byron & Knight
Attys.

Patented May 27, 1924.

1,495,388

UNITED STATES PATENT OFFICE.

ALBERT A. GROSSARTH, OF LA GRANGE, ILLINOIS, ASSIGNOR TO MIEHLE PRINTING PRESS & MANUFACTURING COMPANY, OF CHICAGO, ILLINOIS, A CORPORATION OF ILLINOIS.

GEAR CUTTER.

Application filed June 15, 1922. Serial No. 568,462.

*To all whom it may concern:*

Be it known that I, ALBERT A. GROSSARTH, a citizen of the United States, residing at La Grange, in the county of Cook and State of Illinois, have invented certain new and useful Improvements in Gear Cutters, of which the following is a specification.

This invention relates to gear cutters.

In a form of gear cutter wherein the sides are so nearly parallel that side clearance must be given the teeth in order to produce proper cutting action and where the grinding for resharpening is done on the front of the teeth, it will be appreciated that the thickness of such cutter is gradually reduced as resharpening is repeated. Side clearance is necessary, especially in cutting teeth of the epicycloidal form wherein the cutter and, accordingly, the adjacent sides of adjacent teeth are parallel at the pitch line. Under these circumstances it will be seen that the life of the ordinary gear cutter, which requires frequent sharpening, is relatively short.

One object of my invention is to increase the life of such gear cutters.

Another object is to provide a simple, durable and efficient gear cutter in which means is provided for compensating for the regrinding of cutting teeth for sharpening the latter.

Another object is to provide a gear cutter which is capable of cutting with a uniform degree of accuracy regardless of the wearing of the cutting teeth as a result of regrinding same.

These and other objects are accomplished by means of the gear cutter shown on the accompanying sheet of drawings, in which—

Figure 1 is a side elevation of my improved gear cutter; and

Figure 2 is a sectional view taken in the plane of line 2—2 of Figure 1.

The gear cutter comprises two annular members 10 and 11 having circumferentially spaced complementary tooth or cutting elements 12 and 13, respectively. Each cutting element has a top cutting edge 14 and a side cutting edge 15. The upper surface 16 of each cutting element naturally recedes and the sides 17 of the cooperating cutting element converge rearwardly to provide proper side clearance, this being especially necessary in forming teeth of the epicycloidal form wherein the side cutting edges of the teeth are parallel at the pitch line. The two members 10 and 11 of the cutter, as shown in Figure 2, are spaced axially with respect to each other by means of any suitable spacer 18, but it will be understood that when the cutter is new no spacer 18 will be used. In other words, the two cutter members 10 and 11 will have their adjacent surfaces in engagement with each other. Spacers preferably are inserted only between the members 10 and 11 to compensate for the decrease in width of the teeth occasioned by regrinding. It will be appreciated that when the leading surface of each cutting element 12 and 13 is ground for sharpening the cutting edges 14 and 15 the total width of the cutting surface of the composite tooth will be decreased because of the side clearance. Accordingly, if it is desired to maintain the cutting teeth of the gear cutter of the same effective size it will be necessary to space said gear cutter members 10 and 11 from each other axially a variable amount, depending upon the amount of grinding which has been done and the number of times such teeth are ground. Accordingly, to compensate for such grinding of the cutting teeth the spacer 18 is interposed between the gear cutter elements 10 and 11, and it will be appreciated that the size of the spacer 18 is to be varied in accordance with the amount of grinding which has taken place. The adjacent inner edges of the cutting teeth at the top thereof are provided with grooves 19 to prevent packing of chips at such points.

In actual use the gear cutter members 10 and 11 are secured between collar members 20 and 21 having barrel portions 22 and 23 respectively with interengaged threaded portions for accommodating the cutter regardless of the width of same at the base thereof. As shown, the gear cutter members 10 and 11 are keyed to one of the collar members 20 by means of a key 24, and the other collar member 21 is keyed to any suitable support or arbor 25 by means of a key 26.

It is my intention to cover all modifications of the invention falling within the spirit and scope of the following claims.

I claim:

1. A gear cutter comprising a plurality of members having complementary cutting teeth with side clearance whereby when the front cutting edges of such teeth are ground for sharpening same, the total width of a complete tooth is lessened, said members being capable of being spaced a variable amount to compensate for such grinding, and a spacer interposed between said teeth for controlling the effective total width thereof.

2. A gear cutter comprising a plurality of members each having circumferentially spaced cutting teeth adjacent each other axially, the sides of such teeth having side clearance whereby when the front cutting edges of such teeth are ground for sharpening same, the total width of a complete tooth is lessened, said members being capable of being spaced a variable amount to compensate for such grinding, and a spacer interposed between said teeth for controlling the effective total width thereof.

3. A gear cutter comprising a plurality of cutting elements which may be spaced apart a variable amount to compensate for grinding of such cutting elements for resharpening same, and a spacer interposed between said cutting elements for controlling the effective total width thereof.

4. A gear cutter comprising a plurality of cutting elements which may be spaced apart a variable amount to compensate for grinding of such cutting elements for resharpening same, there being a groove on the top of one of said cutting elements for preventing the packing of chips at such point.

Signed at Chicago, Illinois, this 2nd day of June, 1922.

ALBERT A. GROSSARTH.